(12) United States Patent
Peng

(10) Patent No.: US 11,766,025 B2
(45) Date of Patent: Sep. 26, 2023

(54) AUTOMATIC WATER FEEDER FOR PET

(71) Applicant: Weiyong Peng, Zhejiang (CN)

(72) Inventor: Weiyong Peng, Zhejiang (CN)

( * ) Notice: Subject to any disclaimer, the term of this patent is extended or adjusted under 35 U.S.C. 154(b) by 0 days.

(21) Appl. No.: 18/132,445

(22) Filed: Apr. 10, 2023

(65) Prior Publication Data
US 2023/0240259 A1 Aug. 3, 2023

(51) Int. Cl.
*A01K 7/02* (2006.01)
*C02F 1/28* (2023.01)

(52) U.S. Cl.
CPC .............. *A01K 7/02* (2013.01); *C02F 1/283* (2013.01)

(58) Field of Classification Search
CPC . A01K 7/02; A01K 7/025; A01K 7/00; A01K 39/00; A01K 39/02; B67D 3/0032
See application file for complete search history.

(56) References Cited

U.S. PATENT DOCUMENTS

| | | | |
|---|---|---|---|
| 5,273,083 A * | 12/1993 | Burrows | B67D 1/0835 141/346 |
| 10,779,508 B2 | 9/2020 | Imaizumi et al. | |
| 11,291,183 B1 * | 4/2022 | Mayer | C02F 1/46109 |
| 2010/0050950 A1 * | 3/2010 | Graves | A01K 7/02 119/81 |
| 2018/0014505 A1 * | 1/2018 | Macneil | A01K 5/0135 |
| 2019/0216050 A1 * | 7/2019 | Gevaert | A01K 5/0225 |
| 2019/0313604 A1 * | 10/2019 | Stone | A01K 7/02 |

FOREIGN PATENT DOCUMENTS

WO WO-2021185264 A1 * 9/2021 ............... A01K 7/02

* cited by examiner

*Primary Examiner* — Kristen C Hayes

(57) ABSTRACT

An automatic pet water feeder includes a water replenishing assembly including a bucket body, a bucket cover on a mouth of the bucket body, a silicone plug in the bucket cover, and a movable pin configured to telescopically drive the silicone plug to block and dredge the mouth of the bucket body; and a filter assembly including a shell and a filter element in the shell. One end of the bucket cover is inserted into the shell. The filter element is configured to filter water flowing from the bucket body. The pet water feeder may filter drinking water multiple times through the filter element so that water may be effectively purified. The bucket body may be automatically blocked by gravity through the telescopic movable pin, so that water may not be spilled when being changed.

5 Claims, 9 Drawing Sheets

AUTOMATIC WATER FEEDER FOR PET

FIELD OF THE INVENTION

The invention relates to water fountains and more particularly to an automatic water feeder for pet.

BACKGROUND OF THE INVENTION

A pet water feeder is a container for a pet to drink water, and automatically replenishes the water by gravity. However, a conventional pet water feeder still has the following shortcomings when being used:

Most of the conventional pet water feeders in the market are made of plastic, and difficult to clean and disinfect. There are many pollutants in unfiltered water, and scale easily erodes a plastic surface and breeds bacteria. This causes a gastrointestinal disease of the pet. Therefore, the conventional pet water feeders may no longer meet needs of users.

Thus, the need for improvement still exists.

SUMMARY OF THE INVENTION

To achieve the above purpose, the invention provides the following technical solutions: an automatic pet water feeder. The automatic water feeder includes a water replenishing assembly including a bucket body, a bucket cover disposed on a mouth of the bucket body, a silicone plug disposed inside the bucket cover, and a movable pin configured to telescopically drive the silicone plug to block and dredge the mouth of the bucket body; a filter assembly including a shell and a filter element disposed inside the shell, where one end of the bucket cover is inserted inside the shell, and the filter element is configured to filter water flowing from the bucket body; and a base assembly including a base body and a container disposed inside the base body, where the shell is disposed inside the stainless steel container, and the bucket body is clamped on the base body.

As a preferred technical scheme of the invention, the shell includes an upper cover and a lower cover, the filter element is disposed inside the lower cover, a tapered opening that is concaved towards an inner part of the lower cover is disposed on the upper cover, and one end of the bucket cover far away from the bucket body is inserted inside the inner part of the lower cover through the tapered opening.

As a preferred technical scheme of the invention, the filter element includes filter cotton and a filter material disposed inside the filter cotton, and the filter material is one, two, or more of activated carbon, quartz sand, and silver ion antibacterial balls.

As a preferred technical scheme of the invention, a water outlet enclosure that is circular and sleeved at an inner part of the filter element is disposed inside the lower cover, an inner part of the water outlet enclosure is sleeved with an outer part of the bucket cover, a drain port is disposed on a surface of the bucket cover, a guide port is disposed on a surface of the water outlet enclosure, and a water outlet opposite to the guide port is disposed on one end of the lower cover.

As a preferred technical scheme of the invention, a bump is disposed inside the water outlet enclosure, a log boss that abuts against the bump is disposed at a bottom of the movable pin, and at least one non-slip strip is further disposed on the surface of the bucket cover.

As a preferred technical scheme of the invention, a fixing cylinder is fastened inside the bucket cover, and the silicone plug is in a conical shape of which a bottom diameter is smaller than an inner diameter of the fixing cylinder and a top diameter is larger than the inner diameter of the fixing cylinder.

As a preferred technical scheme of the invention, a bracket is disposed inside the fixing cylinder, at least one supporting rib of which one end is fastened with an inner wall of the fixing cylinder is disposed on a surface of the bracket and configured to support the bracket, and a spring that is disposed between the bracket and the boss is sleeved on the movable pin.

As a preferred technical scheme of the invention, a clamping groove is disposed on a top of the lower cover, and a clamping ring that is clamped with the clamping groove is disposed at a bottom of the lower cover.

As a preferred technical scheme of the invention, the container is made of 304 stainless steel, two areas with different horizontal heights are disposed inside the container, and the filter assembly is located in the area with a higher horizontal height inside the container.

As a preferred technical scheme of the invention, a supporting enclosure is disposed on the top of the base body, a pallet is disposed inside the supporting enclosure and configured to support the bucket body, and at least one rubber pad is disposed at a bottom of the base body.

The invention has the following advantages and benefits in comparison with the conventional technology:

The automatic pet water feeder may filter drinking water multiple times through the filter element, so that water quality may be effectively purified, and health of the drinking water of the pet may be ensured. The bucket body may be automatically blocked by gravity through the telescopic movable pin, so that water may not be spilled when being changed. Bacteria are hard to breed on the 304 stainless steel container, and the container is anticorrosive, and easy to clean. The automatic water feeder has a beautiful appearances, and has various shapes for users to choose. The automatic water feeder has a compact and concise structure and lines with economic benefits, so that it has a broad application prospect.

The above and other objects, features and advantages of the invention will become apparent from the following detailed description taken with the accompanying drawings.

DETAILED DESCRIPTION OF THE INVENTION

Figure 1:
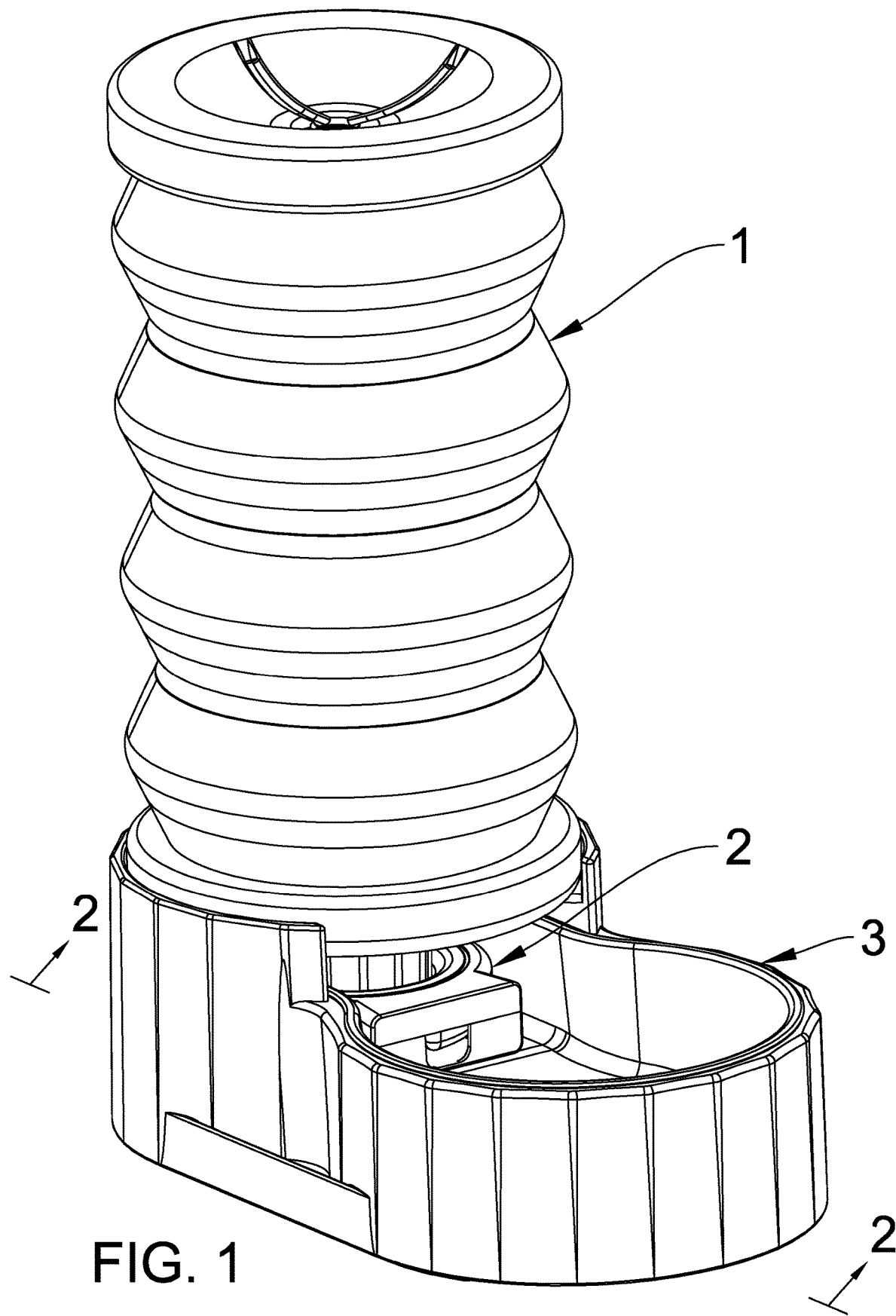
FIG. 1 is a perspective view of an automatic pet water feeder according to a first preferred embodiment of the invention.

The following clearly and completely describes the technical solutions in the embodiments of the invention with reference to accompanying drawings in the embodiments of the invention. Apparently, the described embodiments are only a part rather than all of the embodiments of the invention. All other embodiments obtained by those of ordinary skill in the art based on the embodiments of the invention without creative efforts shall fall within the protection scope of the invention.

Referring to FIG. 1 to FIG. 7, an automatic pet water feeder according to a first preferred embodiment of the invention is shown and comprises a water replenishing assembly 1 including a bucket body 11, a bucket cover 12 disposed on a mouth of the bucket body 11, a silicone plug 18 disposed inside the bucket cover 12, and a movable pin 15 configured to telescopically drive the silicone plug 18 to block and dredge the mouth of the bucket body 11. In this embodiment, a surface of the bucket main body 11 is in a corrugated shape.

The automatic water feeder further comprises a filter assembly 2 including a shell 20 and a filter element 23 disposed inside the shell 20, where one end of the bucket cover 12 is inserted inside the shell 20, and the filter element 23 is configured to filter water flowing from the bucket body 11; and a base assembly 3 including a base body 31 and a container 32 disposed inside the base body 31, where the shell 20 is disposed inside the stainless steel container 32, and the bucket body 11 is clamped on the base body 31.

As a specific technical solution of this embodiment, the shell 20 includes an upper cover 21 and a lower cover 22, the filter element 23 is disposed inside the lower cover 22, a tapered opening 211 that is concaved towards an inner part of the lower cover 22 is disposed on the upper cover 21, and one end of the bucket cover 12 far away from the bucket body 11 is inserted inside the inner part of the lower cover 22 through the tapered opening 211.

Figure 2:
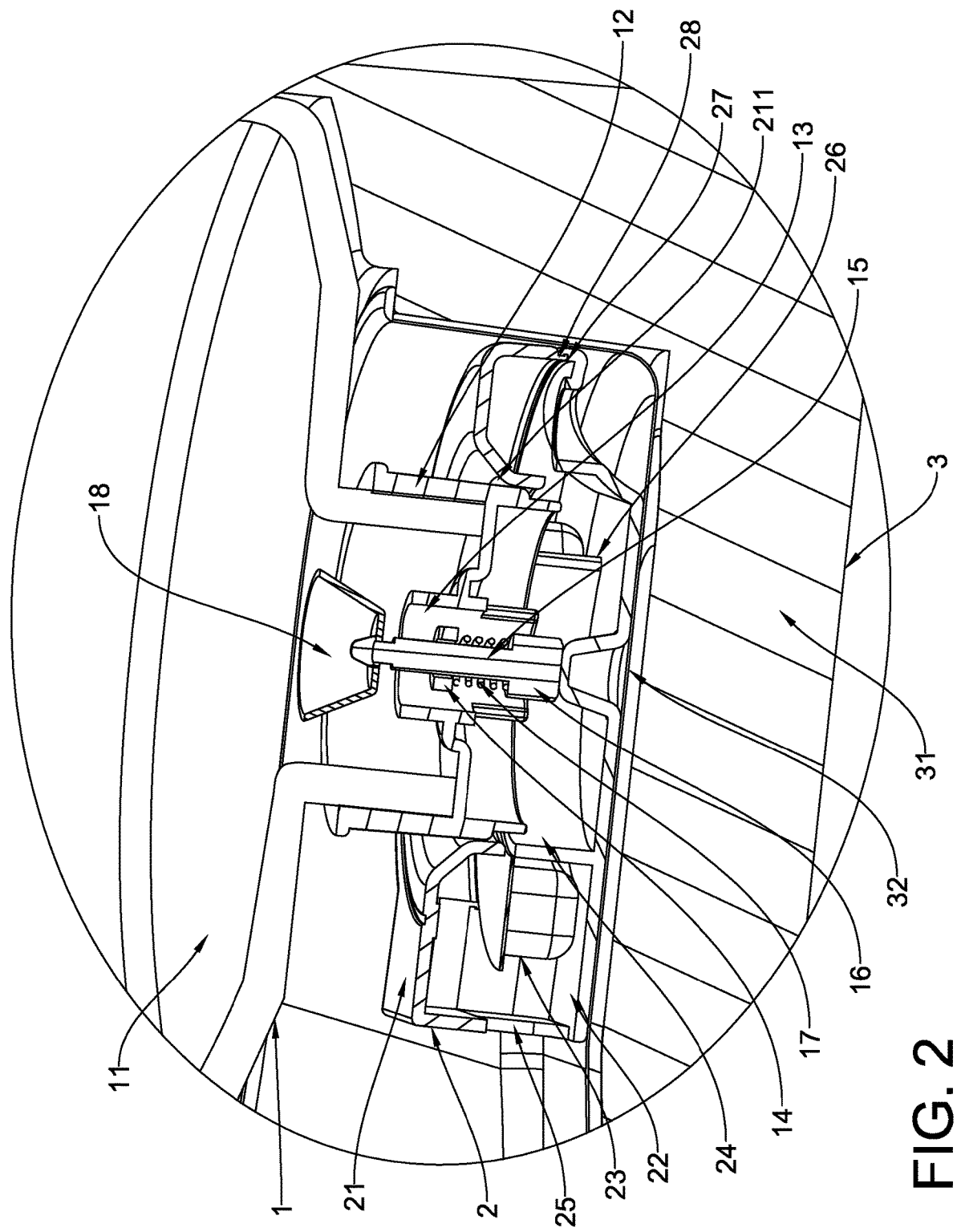
FIG. 2 is a sectional view taken along line 2-2 of FIG. 1.
Figure 3:
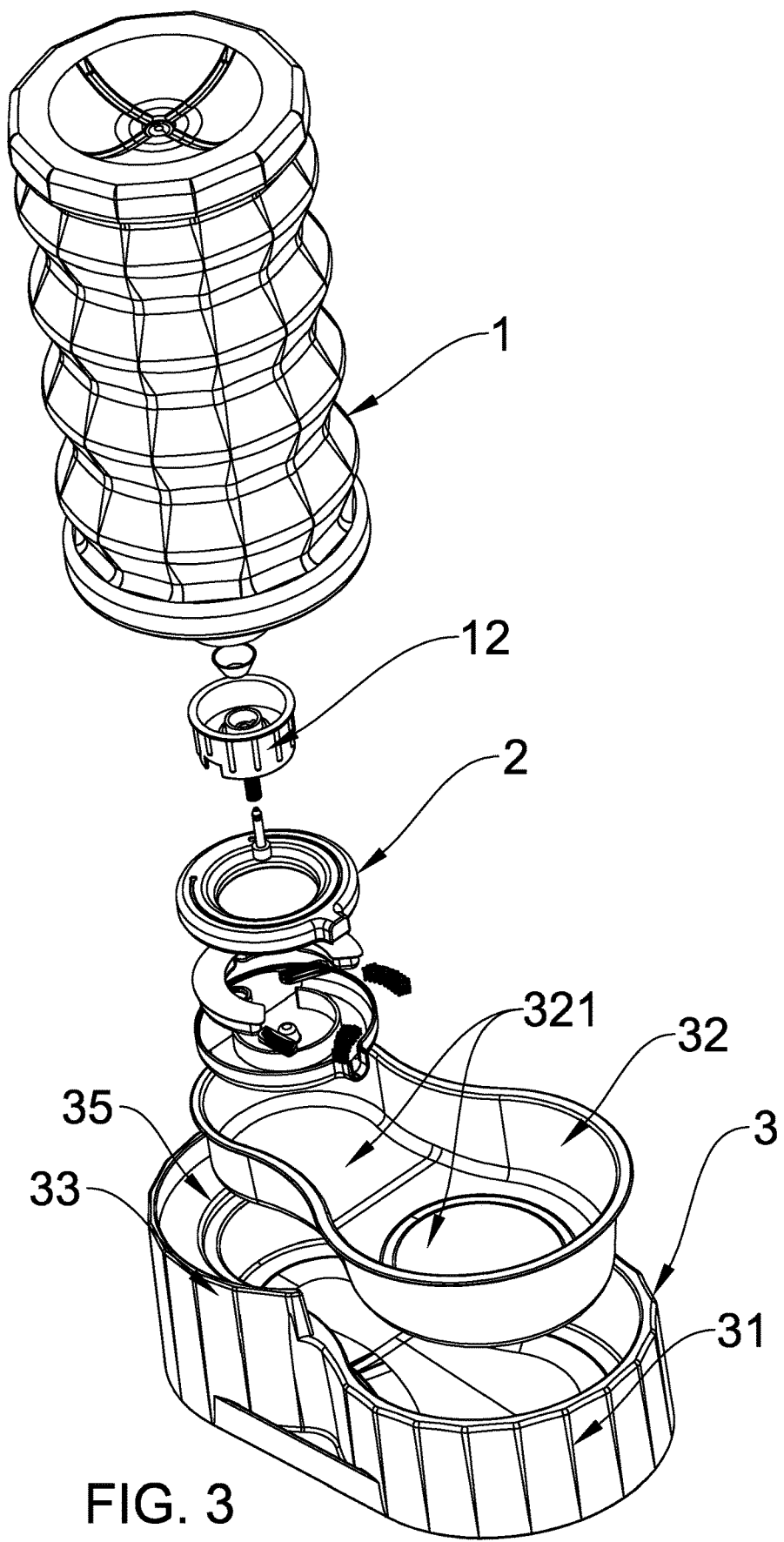
FIG. 3 is an expanded view of the automatic pet water feeder.

As shown in FIG. 2 specifically, when the bucket main body 11 is inserted on the base body 31, the bucket cover 12 is inserted inside a water outlet enclosure 24 through the tapered opening 211, a boss 16 abuts against a bump 241, and the boss 16 drives the movable pin 15 to rise, and in addition, the boss 16 compresses a spring 17. When rising, the movable pin 15 drives the silicone plug 18 to disconnect from a fixing cylinder 13, so that water in the bucket body 11 may enter the water outlet enclosure 24 through the fixing cylinder 13 and a drain port 121 in sequence, may pass a guide port 26 on the water outlet enclosure 24, and may be filtered by the filter element 23. The filtered water flows, through a water outlet 25 to an area 321 that is of the container 32 and has a low horizontal height for the pet to drink.

As a specific technical solution of this embodiment, the filter element 23 includes filter cotton 231 and a filter material 232 disposed inside the filter cotton 231, and the filter material 232 is one, two, or more of activated carbon, quartz sand, and silver ion antibacterial balls. Water flows out from the guide port 26 and is filtered by the filter element 23. This effectively filters impurities and harmful substances in the water, so that drinking water for the pet is safer.

As a specific technical solution of this embodiment, a water outlet enclosure 24 that is circular and sleeved at an inner part of the filter element 23 is disposed inside the lower cover 22, an inner part of the water outlet enclosure 24 is sleeved with an outer part of the bucket cover 12, the drain port 121 is disposed on a surface of the bucket cover 12, the guide port 26 is disposed on a surface of the water outlet enclosure 24, and a water outlet 25 opposite to the guide port 26 is disposed on one end of the lower cover 22. Due to a design that the guide port 26 is opposite to the water outlet 25, the water does not directly flow from the water outlet 25 when flowing from the drain port 121, and the water may flow outside only after being filtered by the filter element 23.

Figure 4:
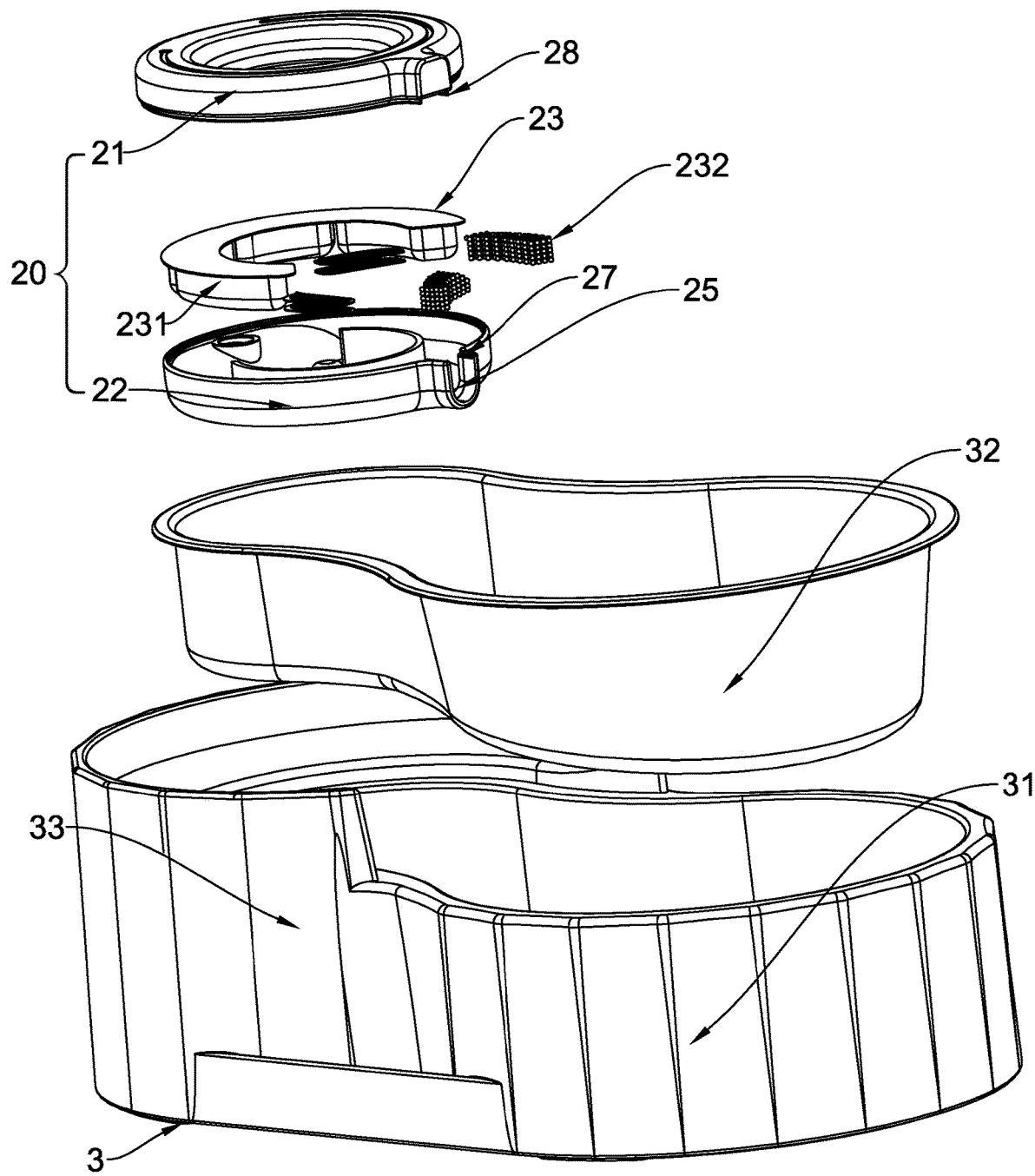
FIG. 4 is an expanded view of the filter assembly and the base assembly.
Figure 5:
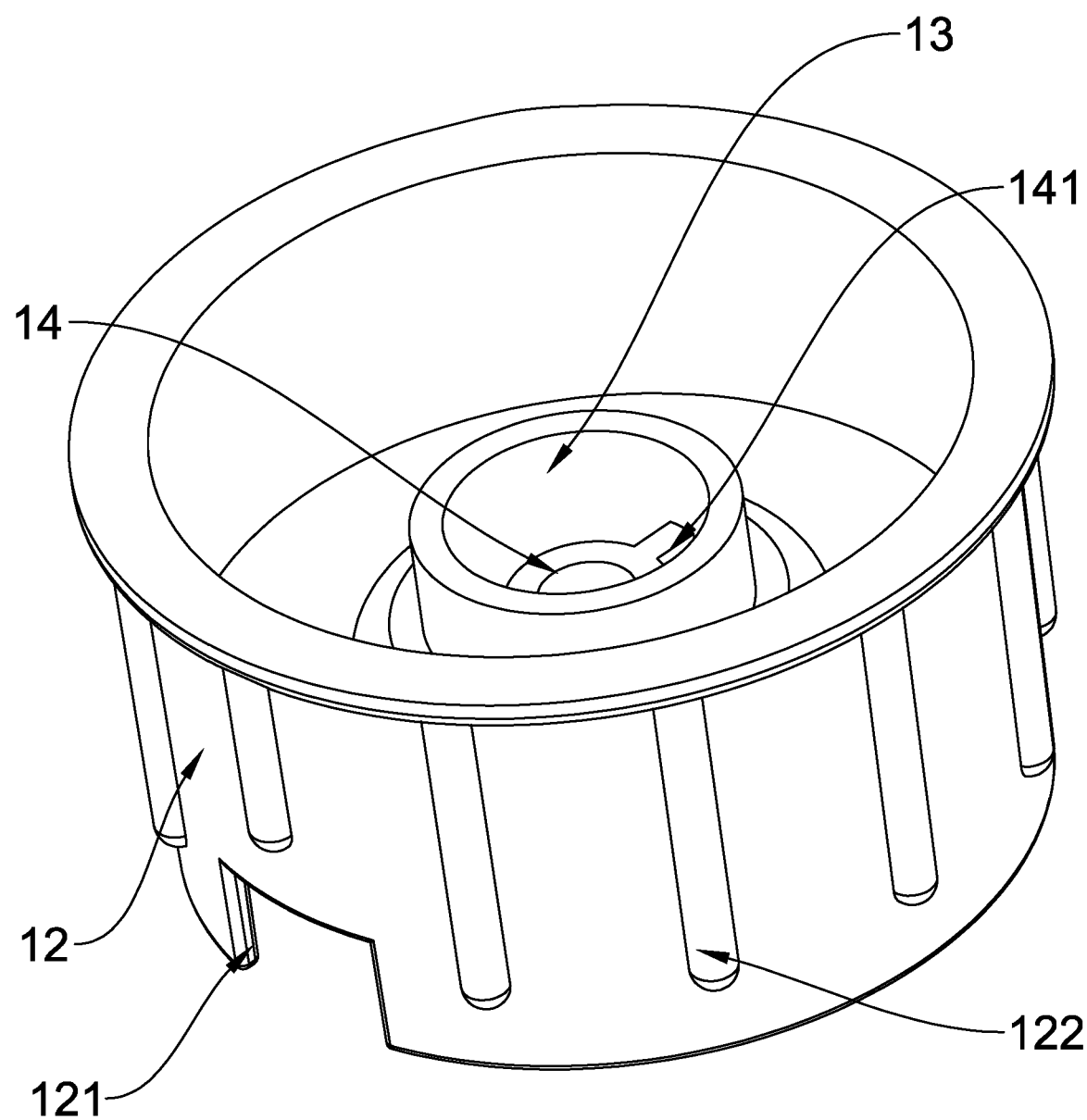
FIG. 5 is a perspective view of the bucket cover.
Figure 6:
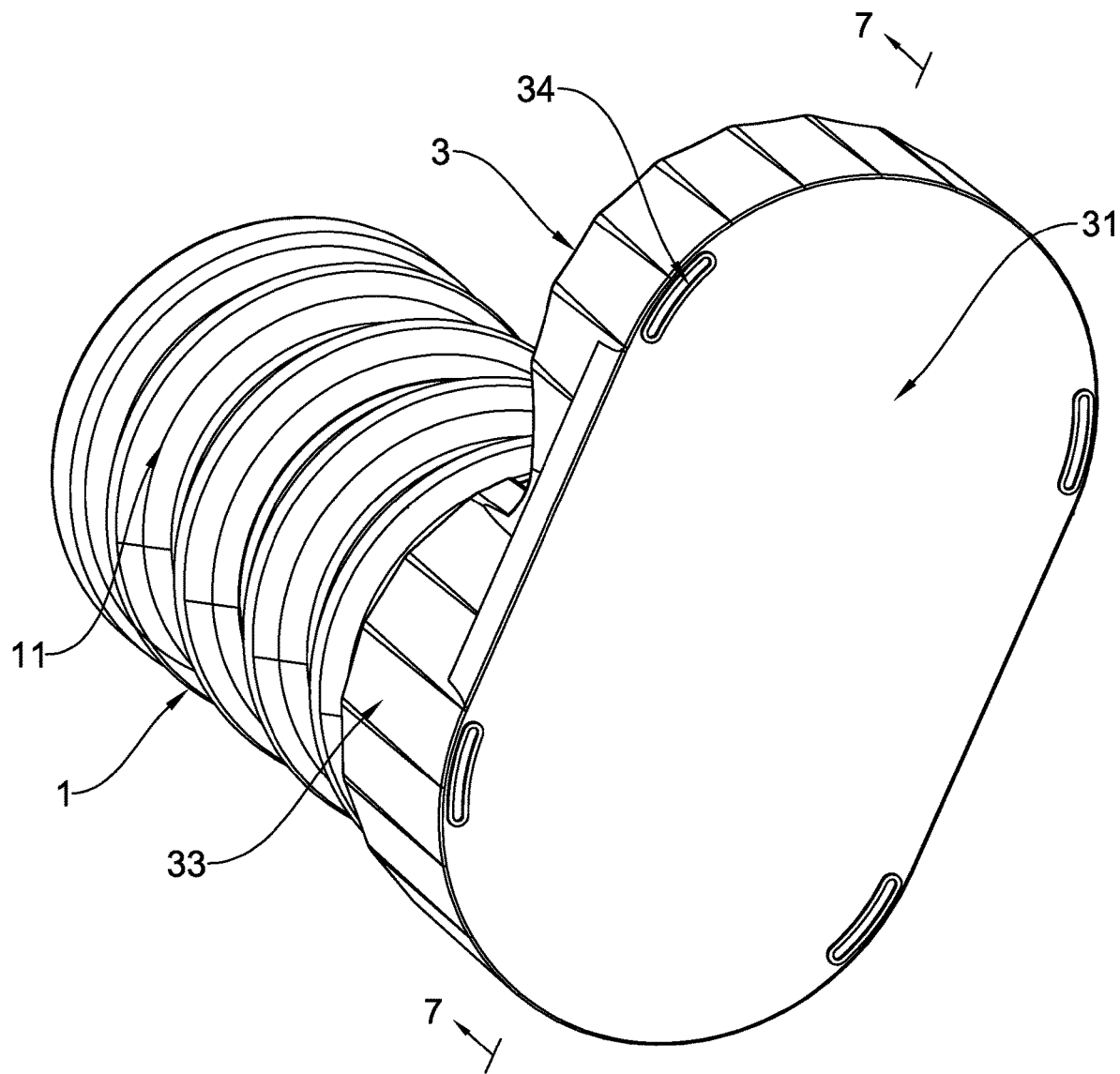
FIG. 6 is another perspective view of the automatic pet water feeder showing its rubber pad on a bottom.
Figure 7:
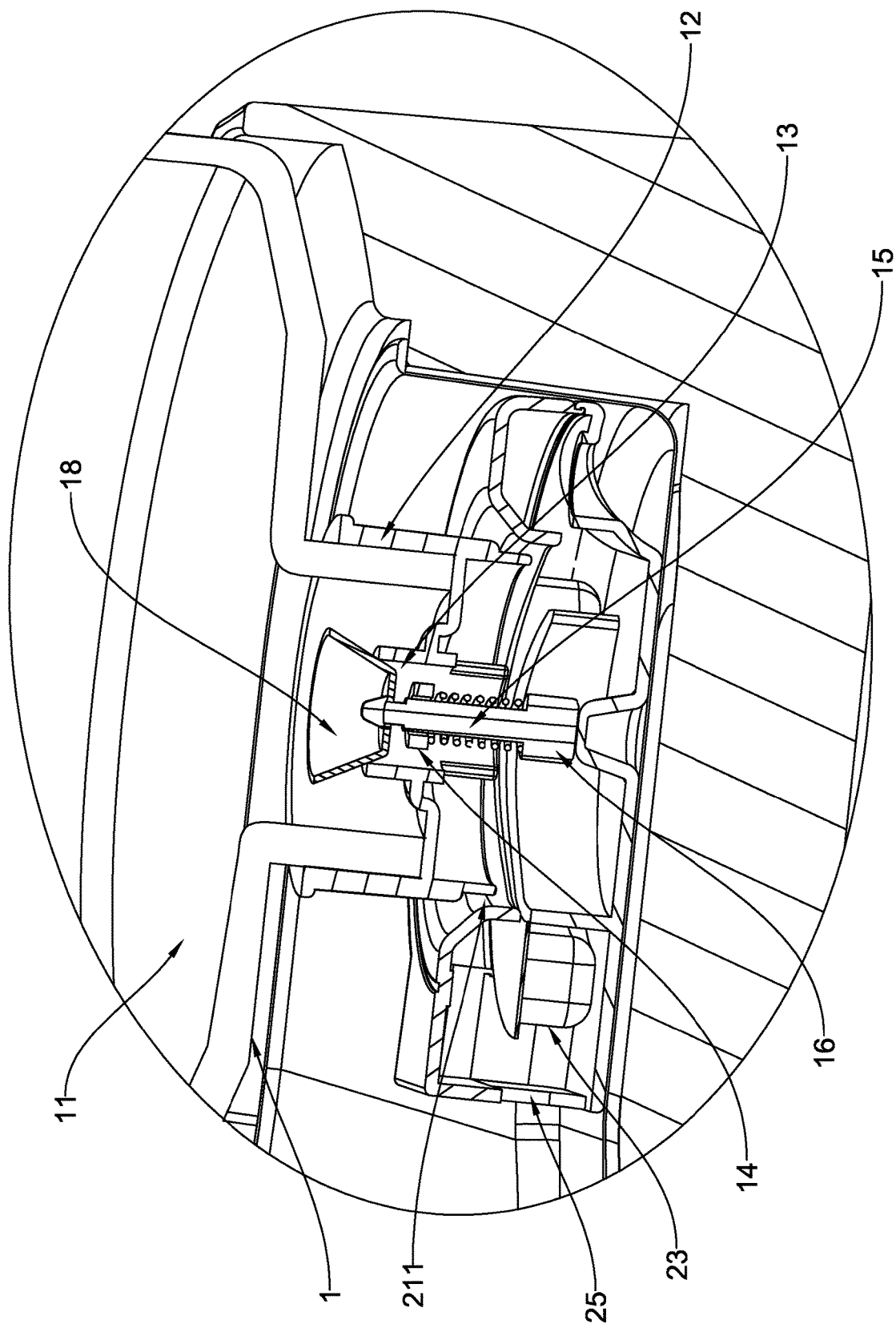
FIG. 7 is a sectional view taken along line 7-7 of FIG. 6.

As shown in FIG. 2 and FIG. 4 specifically, there is at least one piece of filter cotton 231, and the water passes a plurality pieces of filter cotton 231 in sequence and is filtered by the filter material 232 inside the filter cotton. This further ensures filtering effect.

As a specific technical solution of this embodiment, the bump 241 is disposed inside the water outlet enclosure 24, the boss 16 that abuts against the bump 241 is disposed at a bottom of the movable pin 15, and at least one non-slip strip 122 is further disposed on the surface of the bucket cover 12. The bucket cover 12 and the mouth of the bucket body 11 are connected in a threaded manner. A user may conveniently rotate the bucket cover 12 due to the non-slip strip 122. When being assembled, the bucket body 11 may automatically abuts against the boss 16 due to the bump 241, to dredge the mouth of the bucket body 11. When the user lifts the bucket body 11, the bucket cover 12 rises and drives the movable pin 15 and the boss 16 to disconnect from the bump 241, and the spring 17 springs back and drives the movable pin 15 to descend and reset, so that the movable pin 15 may drive the silicone plug 18 to abut against the fixing cylinder 13, to re-block the bucket mouth. This avoids the water in the bucket body 11 from flowing outside.

As a specific technical solution of this embodiment, the fixing cylinder 13 is fastened inside the bucket cover 12, and the silicone plug 18 is in a conical shape of which a bottom diameter is smaller than an inner diameter of the fixing cylinder 13 and a top diameter is larger than the inner diameter of the fixing cylinder 13. When the movable pin 15 descends, a bottom of the silicone plug 18 enters the fixing cylinder 13. While the movable pin 15 descends, a top of the silicon plug 18 with a larger diameter abuts against the fixing cylinder 13, to tightly block the mouth of the bucket body 11.

As a specific technical solution of this embodiment, a bracket 14 is disposed inside the fixing cylinder 13, at least one supporting rib 141 of which one end is fastened with an inner wall of the fixing cylinder 13 is disposed on a surface of the bracket 14 and configured to support the bracket 14, and a spring 17 that is disposed between the bracket 14 and the boss 16 is sleeved on the movable pin 15.

As a specific technical solution of this embodiment, a clamping groove 27 is disposed on a top of the lower cover 22, and a clamping ring 28 that is clamped with the clamping groove 27 is disposed at a bottom of the lower cover 22.

As shown in FIG. 2 specifically, the clamping ring 28 is clamped inside the clamping groove 27, to complete assembly of the upper cover 21 and the lower cover 22. Operations are simple, which is beneficial to subsequently disassemble and replace the filter element 23.

As a specific technical solution of this embodiment, the container 32 is made of 304 stainless steel, two areas 321 with different horizontal heights are disposed inside the container 32, and the filter assembly 2 is located in the area 321 with a higher horizontal height inside the container 32.

As shown in FIG. 1 and FIG. 2 specifically, the water flowing from the water outlet 25 directly flows to the area 321 that is in the container 32 and that has a low horizontal height, so that the pet may easily drink.

As a specific technical solution of this embodiment, a supporting enclosure 33 is disposed on the top of the base body 31, a pallet 35 is disposed inside the supporting enclosure 33 and configured to support the bucket body 11, and at least one rubber pad 34 is disposed at a bottom of the base body 31. The pallet 35 and the support enclosure 33 may support the bucket body 11, and the base body 31 may be stably placed due to the rubber pad 34.

For use, when the bucket main body 11 is inserted on the base body 31, the bucket cover 12 is inserted inside the water outlet enclosure 24 through the tapered opening 211, the boss 16 abuts against a bump 241, and the boss 16 drives the movable pin 15 to rise, and in addition, the boss 16 compresses the spring 17. When rising, the movable pin 15 drives the silicone plug 18 to disconnect from the fixing cylinder 13, so that water in the bucket body 11 may enter the water outlet enclosure 24 through the fixing cylinder 13 and the drain port 121 in sequence, may pass the guide port 26 on the water outlet enclosure 24, and may be filtered by the filter element 23. The filtered water flows, through the water outlet 25, to an area 321 that is of the container 32 and has a low horizontal height for the pet to drink.

Figure 8:
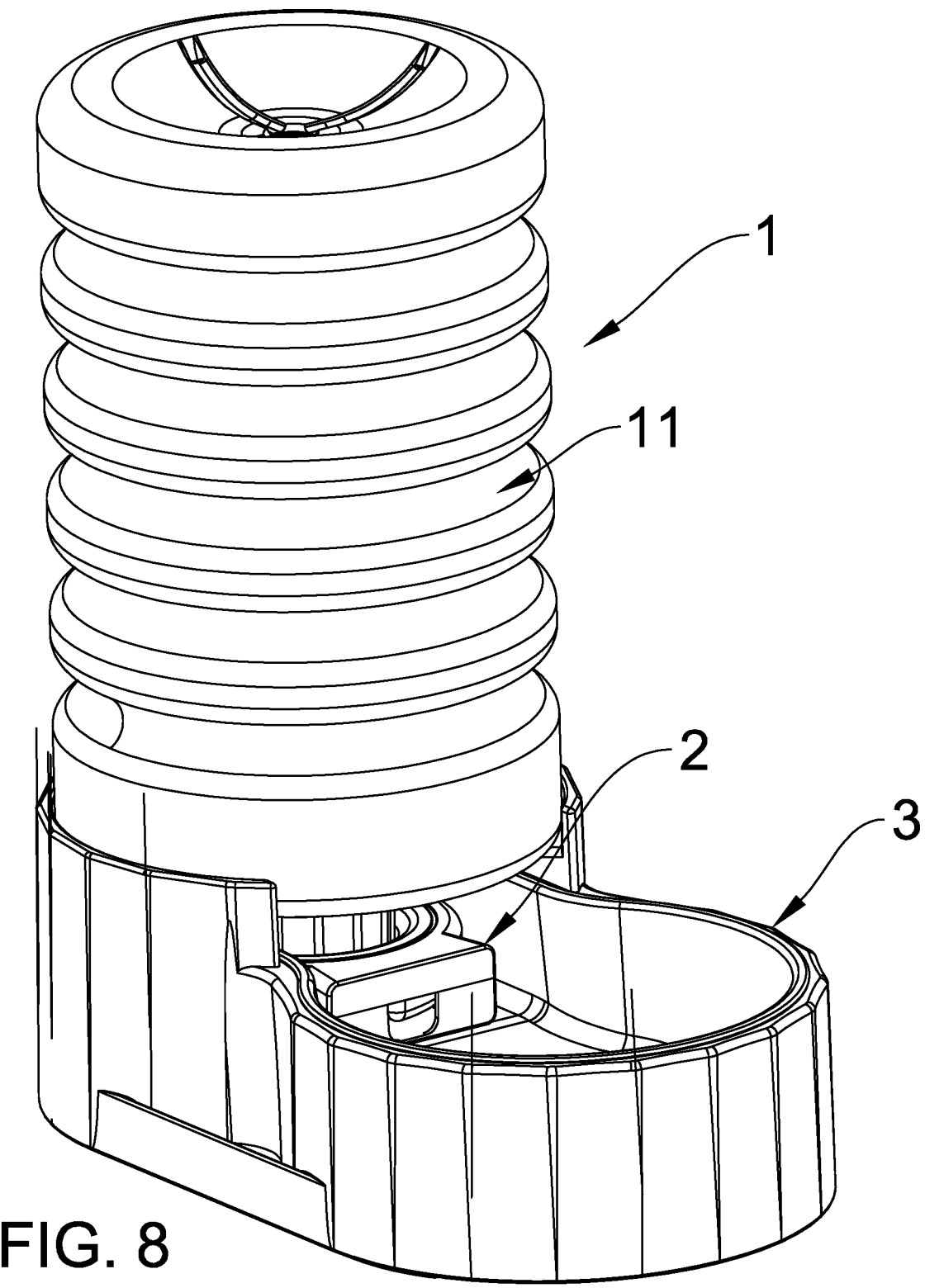
FIG. 8 is a perspective view of an automatic pet water feeder according to a second preferred embodiment of the invention.

Referring to FIG. 8, an automatic pet water feeder according to a second preferred embodiment of the invention is shown. The characteristics of the second preferred embodiment are substantially the same as that of the first preferred embodiment except the following: a ripple amplitude of the bucket body 11 becomes smaller and is more beautiful in appearance, so that the automatic water feeder is more conveniently carried by a user.

Figure 9:
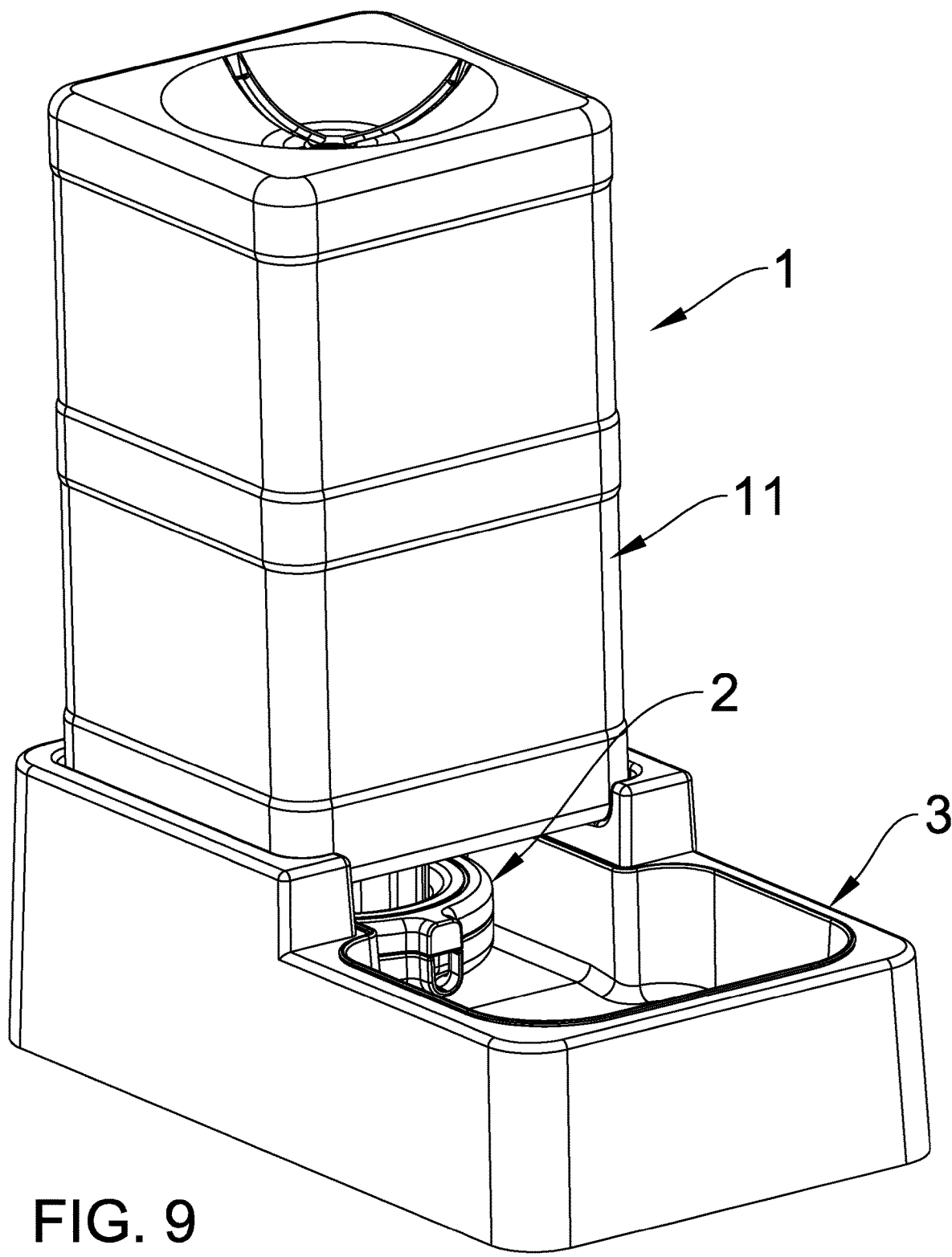
FIG. 9 is a perspective view of an automatic pet water feeder according to a third preferred embodiment of the invention.

Referring to FIG. 9, an automatic pet water feeder according to a third preferred embodiment of the invention is shown. The characteristics of the third preferred embodiment are substantially the same as that of the first and second preferred embodiments except the following: the bucket body 11 and the base assembly 3 are in a square shape for users having different aesthetic needs to select. Another shape with same use effect may also be adopted. In this embodiment, a square shape is preferentially adopted as shapes of the bucket main body 11 and the base assembly 3.

In conclusion, as shown in FIGS. 1 to 9 specifically, the automatic pet water feeder may filter drinking water multiple times through the filter element 23, so that water quality may be effectively purified, and health of the drinking water of the pet may be ensured. The bucket body 11 may be automatically blocked by gravity through the telescopic movable pin 15, so that water may not be spilled when being changed. Bacteria are hard to breed on the 304 stainless steel container 32, and the container is anticorrosive, and easy to clean. The automatic water feeder has a beautiful appearances, and has various shapes for users to choose. The automatic water feeder has a compact and concise structure and lines with economic benefits, so that it has a broad application prospect.

While the invention has been described in terms of preferred embodiments, those skilled in the art will recognize that the invention can be practiced with modifications within the spirit and scope of the appended claims.

What is claimed is:

1. An automatic pet water feeder, comprising:
   a water replenishing assembly comprising a bucket body, a bucket cover disposed on a mouth of the bucket body, a silicone plug disposed inside the bucket cover, and a movable pin configured to telescopically drive the silicone plug to block and dredge the mouth of the bucket body;
   a filter assembly comprising a shell and a filter element disposed inside the shell, wherein one end of the bucket cover is inserted inside the shell, and the filter element is configured to filter water flowing from the bucket body; and
   a base assembly comprising a base body and a container disposed inside the base body;
   wherein the shell is disposed inside the container; and
   wherein the shell comprises an upper cover and a lower cover, the filter element is disposed inside the lower cover, a tapered opening that is concaved towards an inner part of the lower cover is disposed on the upper cover, and one erid of the bucket cover far away from the bucket body is inserted inside the inner part of the lower cover through the tapered opening.

2. The automatic pet water feeder of claim 1, wherein the filter element comprises a filter cotton and a filter material disposed inside the filter cotton, and the filter material is one, two, or more of activated carbon, quartz sand, and silver ion antibacterial balls.

3. The automatic pet water feeder of claim 2, wherein a water outlet enclosure that is circular and sleeved at an inner side of the filter element is disposed inside the lower cover, an inner part of the water outlet enclosure is sleeved with an outer part of the bucket cover, a drain port is disposed on a surface of the bucket cover, a guide port is disposed on a surface of the water outlet enclosure, and a water outlet opposite to the guide port is disposed on one end of the lower cover.

4. The automatic pet water feeder of claim 3, wherein a bump is disposed inside the water outlet enclosure, a boss that abuts against the bump is disposed at a bottom of the movable pin, and at least one non-slip strip is further disposed on the surface of the bucket cover.

5. The automatic pet water feeder of claim 4, wherein a clamping groove is disposed on a top of the lower cover, and a clamping ring that is clamped with the clamping groove is disposed at a bottom of the lower cover.

* * * * *